Dec. 6, 1955   R. W. SAUMSIEGLE   2,726,028
CAP SCREWING AND TIGHTENING MACHINE
Filed Aug. 5, 1953   3 Sheets-Sheet 1
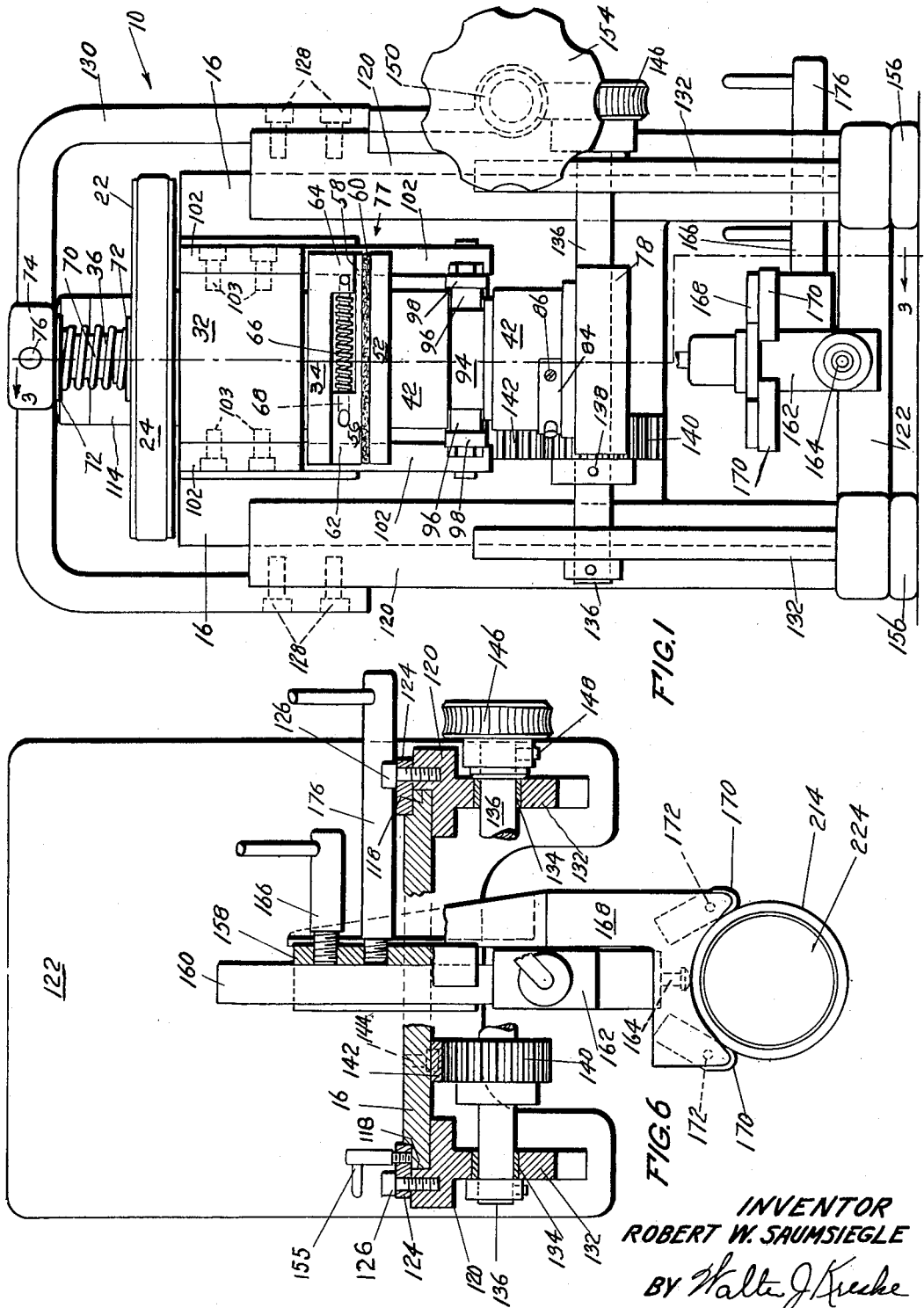
INVENTOR
ROBERT W. SAUMSIEGLE
BY Walter J Krecke
ATTORNEY Dec. 6, 1955   R. W. SAUMSIEGLE   2,726,028
CAP SCREWING AND TIGHTENING MACHINE
Filed Aug. 5, 1953   3 Sheets-Sheet 2
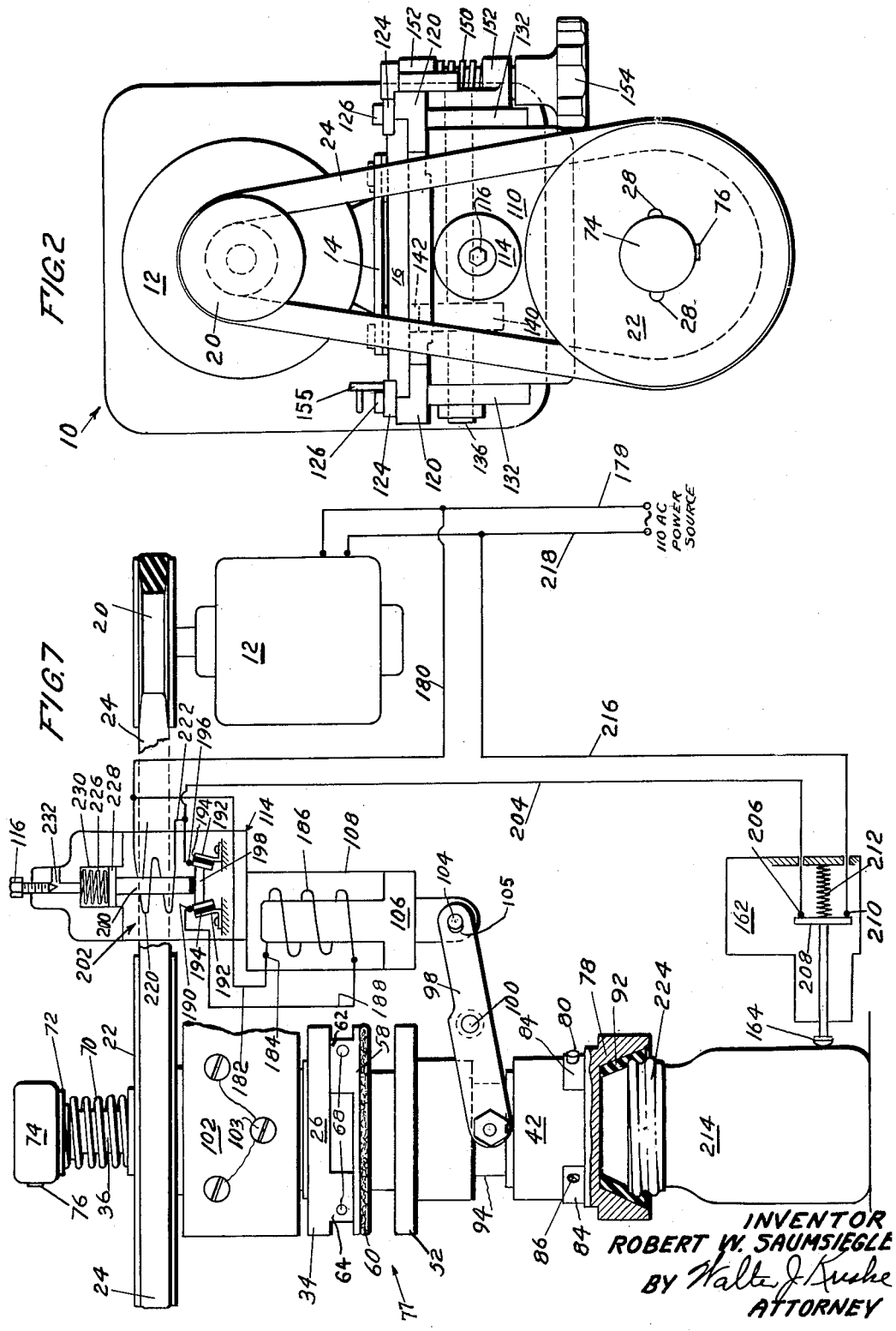
INVENTOR
ROBERT W. SAUMSIEGLE
BY Walter J. Kuche
ATTORNEY Dec. 6, 1955  R. W. SAUMSIEGLE  2,726,028
CAP SCREWING AND TIGHTENING MACHINE
Filed Aug. 5, 1953  3 Sheets-Sheet 3
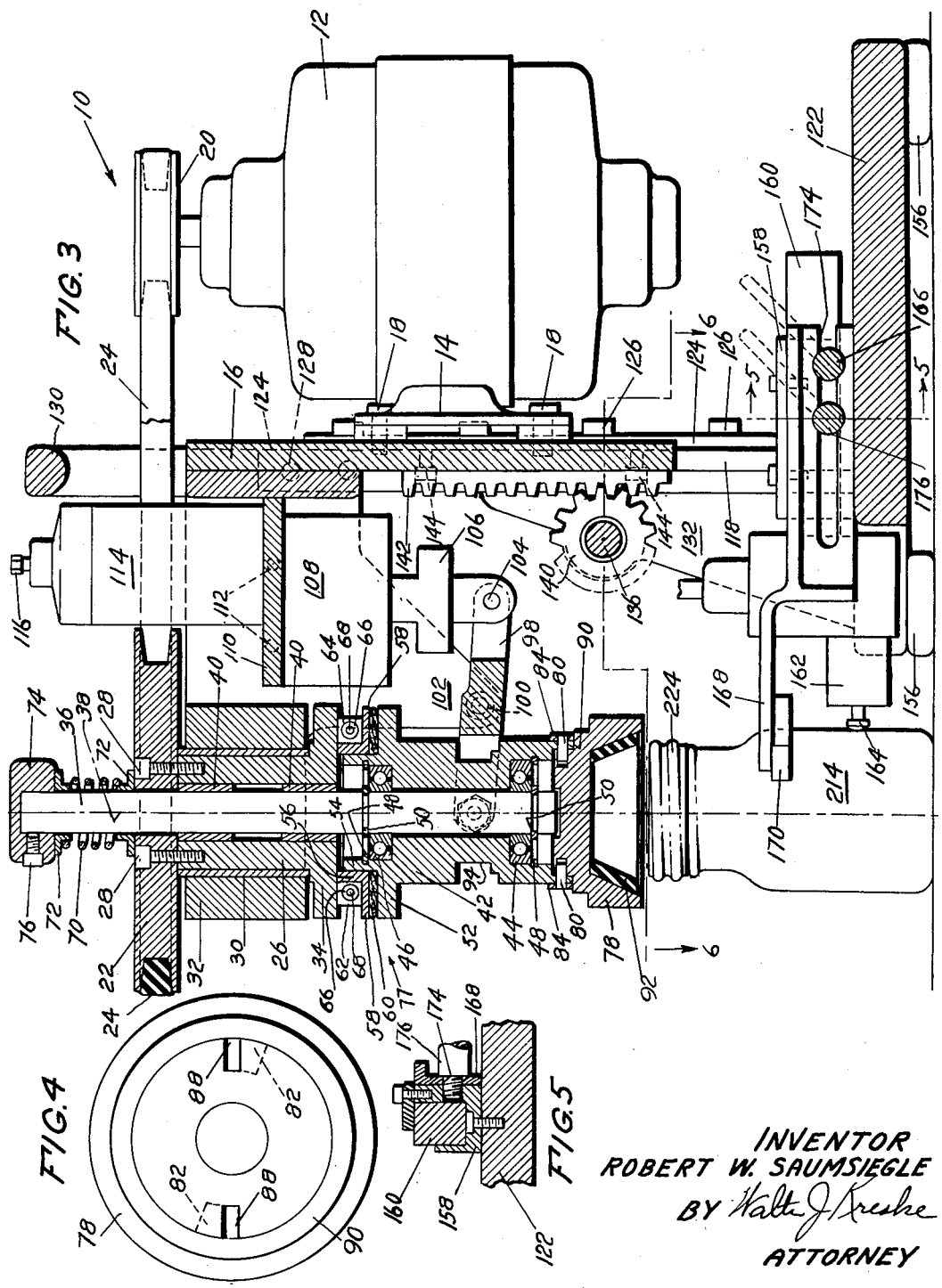
INVENTOR
ROBERT W. SAUMSIEGLE
BY
ATTORNEY United States Patent Office 2,726,028
Patented Dec. 6, 1955

2,726,028

CAP SCREWING AND TIGHTENING MACHINE

Robert W. Saumsiegle, Lexington, Mass.

Application August 5, 1953, Serial No. 372,498

11 Claims. (Cl. 226—88)

This invention relates to machines for screwing and tightening caps on containers.

Heretofore machines of this type have usually been relatively large and cumbersome and not readily adaptable to rapid and efficient relocation to meet changing production needs. This was generally due to the intricacy and size of mechanical mechanism found necessary to perform the cap screwing and tightening operation. The size was determined to a large extent by the largest cap for which the machine was adaptable. As the diameter of the cap increased, the turning moment or torque required for achieving a given tightness on the container increased. Also, increased torque generally necessitated an increase in the downward pressure upon the cap to obtain the necessary frictional contact between machine chuck and the cap for transmitting the increased torque to the cap. This increased torque and pressure in turn required increased size of mechanism components throughout the entire machine to provide the strength and power needed to accommodate the increased torque requirements.

In an instance where mechanism was achieved which did not need increase in overall size to accommodate increased torque requirements the mechanism was such as to require considerable physical manipulation on the part of the operator for its proper functioning. Such necessary physical manipulation with each capping operation placed an undesirable limitation on the number of containers which could be tightened with the machine in a given time. This undesirable manipulatory effect on capping efficiency was further aggravated by operator fatigue from the physical exertions involved. The operator fatigue factor increased as the diameter of the cap and therefor the torque and pressure requirements for tightening the cap on the container increased.

Pursuant to the present invention, the above are overcome in a machine which also includes other desirable objects and advantages. Among these are a machine which is so compact and light that it is hand portable by a single individual. Another is that the machine needs no special installation manipulations other than placing it on a firm surface as a bench and plugging it into a standard electrical power source to prepare it for operation.

Despite its compactness and lightness, the machine is adaptable to substantially the entire range of cap and container sizes encountered in normal commercial use. This includes not only adaptability to physical size of cap and container, but also to degree of tightness of seating of the cap on the container. The former, adaptability from one physical cap size to another, requires only a simple change in size of chuck used for gripping the cap. The latter, adaptability to the changing of tightness of seating of the cap on the container, requires only a change in the kinetic energy at the chuck used for gripping the cap. This kinetic energy may be changed either by changing the speed of rotation of the chuck or by changing the chuck to one having a different moment of inertia. To change the chuck for another of different size or of different moment of inertia consists of a simple manual twisting operation in one direction to release the chuck and in the opposite direction to lock a selected chuck firmly in place ready for use.

Operational simplicity in the machine has been achieved which permits the ready use of unskilled labor. It involves only the manual placement and holding of a container with a cap loosely seated thereon against a locating device for that purpose to incite a rapid automatic screwing and tightening cycle. After completion of the screwing and tightening cycle, the container with its suitably tightened cap may be manually removed to leave the machine available for a new similar screwing and tightening cycle.

A further object is the achievement of a functional arrangement which succeeds in releasing both hands of the operator for container positioning and removal from the machine, to thereby achieve a maximum operational efficiency. That is, while the operator is removing a previous capped container from the machine with one hand, he may with the other hand be inserting a new container to be capped by the machine. No special physical manipulation is required for operating the machine.

The above are achieved generally by providing a machine with a chuck for gripping the cap mounted to rotate about and move along an axis in alignment with the cap and container, an element yieldably holding the chuck in space relation with the cap, an electric circuit, an electromagnetic device in the circuit connected to move the chuck into gripping engagement with the cap, and a normally open switch in th ecircuit to control the operation of the electromagnetic device.

The release of both hands of an operator for container movement to and from the machine is achieved by placing the normally open switch in position where it will be closed by the container when in alignment with the chuck, and including a time delay mechanism in operative engagement with the normally open switch to open the circuit in a controlled period of time after the normally open switch is closed to allow retraction of the chuck by the yieldable element and thereby permit removal of the container with its properly tightened cap.

Simplicity of construction and operation is achieved by using in the time delay mechanism a normally closed switch in the electric circuit, a second electric circuit in control engagement with the normally open switch, and a time delay relay in the second electric circuit connected to open the normally closed switch in a controlled period after the normally open switch is closed. The controlled period is of duration sufficient to insure proper tightening of the cap by the chuck.

By making the electromagnetic and time delay devices as solenoids with armatures connected to perform the operating functions involved by each, rugged and inexpensive construction, available as standard commercial components, is achieved.

By providing a disengageable clutch between the chuck and the mechanism for rotating the chuck, an arrangement using only kinetic energy alone for screwing and tightening the cap is achieved. The use of kinetic energy alone in this manner insures a repetitive accuracy in the degree of tightening of each cap on its container. It also helps materially to reduce the required bulk and weight of the machine. With this arrangement increased tightening torques are produced by merely increasing the speed of the chuck or selecting a chuck with increased moment of inertia rather than increasing the size of the motor and all operating mechanism throughout the machine. Also, completely disengaging the clutch for each tightening cycle rather than depending upon a slipping type clutch or slippage in the mechanism avoids the possibility of breakage of operating components in the event the mechanism fails to slip because of foreign matter or other cause resulting in its malfunction.

By making the mechanism for driving the clutch in the form of a spindle mounted to rotate about an axis aligned with the cap and container, and providing a slidable shaft at this axis through the spindle with a chuck rotatably mounted at the end of the shaft, a relatively inexpensive, compact, and extremely rugged construction is achieved.

By mounting the spindle and motor on a vertical support plate and providing a base with guide brackets slidably receiving the ends of the support plate, a compact arrangement adjustable to containers of varying heights is achieved.

These and other features, objects and advantages of the invention will become more apparent from the following description taken in connection with the accompanying drawings which depict a preferred embodiment of the invention and wherein:

Fig. 1 is a front elevation of the preferred embodiment of the invention,

Fig. 2 is a top view at a reduced scale of the embodiment shown in Fig. 1 with the handle removed, Fig. 3 is a cross sectional view taken on line 3—3 of Fig. 1, Fig. 4 is a top view of the chuck to more clearly show construction of the quick locking arrangement, Fig. 5 is a detail cross sectional view taken on line 5—5 of Fig. 3 to more clearly show construction of the operating switch and locating gage slide construction, Fig. 6 is a view taken on line 6—6 of Fig. 3 with the vertical support plate partially cut away to show construction and arrangement of the container locating gage and the normally open operating switch, Fig. 7 is a view showing the chuck and spindle portions of the machine in side elevation with the chuck partially sectioned and in gripping engagement with a cap, and showing the electrical circuits and components schematically to more clearly disclose their operating arrangement.

Referring to the drawings in more detail, the preferred embodiment of my machine is designated generally by the numeral 10 (Figs. 1, 2 and 3). Guards and shields over moving parts as pulleys and spindle are optional and are not shown. The machine 10 has an electric motor 12 fixed at its base 14 to a vertical support plate 16 as by screws 18 and mounts 19. The mounts 19 may be of the resilient vibration damping variety if desired. The motor 12 has a pulley 20 for driving a pulley 22 by means of a belt such as the V belt 24. The driven pulley 22 is rigidly fixed to the top end of an idler spindle 26 as by screws 28. The idler spindle 26 is mounted to rotate in a suitable bearing 30 which is rigidly held in a support sleeve 32. Longitudinal movement of the idler spindle 26 is restricted by the pulley 22 and a flange 34 at the lower end of the spindle 26.

Extending through the idler spindle 26 is a shaft or chuck spindle 36 having a longitudinal axis 38 substantially coinciding with the rotational axis of the idler spindle 26. The shaft 36 is mounted free to rotate about and slide along the longitudinal axis 38 by sleeve bearings 40 fixed to the idler spindle 26.

A chuck adapter 42 is mounted onto the lower end of the shaft 36 to rotate about the axis 38 as by ball bearing type antifriction bearings 44 and 46. The bearings 44 and 46 are held in place on the adapter by retaining rings 48 and on the shaft 36 by retaining rings 50. At its upper end, the adapter 42 has a flange 52 and cylindrical neck portion 54 adapted to cooperate with a sleeve 56 having a flange 58. The flange 58 is in opposed relation of the flange 52 on the adapter 42 and carries rigidly fixed to it, a friction clutch disk 60. The disk 60 may be fixed to the flange 58 by any suitable means as rivets (not shown) and is of any suitable frictional clutch driving material to thereby provide a frictional driving clutch arrangement with the flange 52 on the chuck adapter 42. The flanged sleeve 56 has a shoulder portion or lug 62 (Figs. 1, 3 and 7) in opposed relation to similar shoulder portion or lug 64 at the bottom of the flange 34 of the spindle 26. A spring 66 located at its ends on arbors 68 which are fixed in the shoulders 62 and 64 respectively provides a suitable shock absorbing construction in the transmission of motion from the spindle 26 to the adapter 42 as will be hereinafter more fully described. A similar spring 66, arbors 68 and shoulders 62 and 64 arrangement in reverse order is symmetrically placed in opposed relation to that just described and illustrated in Fig. 1 which is therefore not visible in Fig. 1. It is partially visible and so enumerated in Fig. 3.

A compression spring 70 located about the top end of the shaft 36 between bushings 72 (Fig. 3) is held in compression on the shaft 36 between the upper face of the pulley 22 and a cap 74 fixed to the upper end of the shaft 36 as by a screw 76. The compression spring 70 pressing upwardly on the cap 76 transmits thereby, an upward pressure through the retaining ring 50 and bearings 44 on the adapter 42. This upward pressure on the adapter 42 provides yieldable engagement between the driver elements consisting of flange 58 and clutch disk 60, and the driven element consisting of the flange 52 on the adapter 42 to provide a disengageable clutch arrangement 77.

The bottom end of the adapter 42 is recessed to receive the stem of a chuck 78. Two lock pins 80 extend inwardly from opposed points on the periphery of the adapter 42 into corresponding undercut lock sections 82 at the stem of the chuck 78 to lock the chuck 78 in place at the bottom end of the adapter 42. The pins 80 are held in place in holes extending radially through the adapter 42 by arcuate leaf spring elements 84 which are fastened to the adapter 42 as by screws 86 (Figs. 1 and 7). Slots 88 are provided at corresponding positions on each of the undercut locking sections 82 to permit insertion and locking of the chuck 78 in place at the bottom end of the adapter 42. This is done by aligning the slots 88 with the pins 80, moving the chuck upwardly until the shoulder 90 engages the bottom end of the adapter 42, then giving the chuck 78 a rotary twist in relative relation to the adapter 42 to cause the pins 80 to ride into the undercut sections 82 and thereby effectively lock the chuck 78 in place.

The bottom portion of the chuck 78 is recessed and has fixed thereto, a resilient gripping material such as a rubber composition gripping element 92. The gripping element 92 is preferably positioned at a slight angle with respect to the axis 38 as shown in Figs. 3 and 7 to increase its gripping action when pressed downward on container caps.

The adapter 42 has a groove 94 located substantially centrally about its periphery. Extending inwardly into the groove 94 are two opposed roller members 96 rotatably fixed to one end of a lever arm 98. The lever arm 98 is mounted to pivot substantially centrally thereof about a pivot pin 100 fixed at its ends in opposed brackets 102 which are rigidly fastened to the vertical support plate 16 as by screws (not shown) or other suitable means. The opposed brackets 102 also straddle and hold the support sleeve 32 rigidly in place as by screws 103.

The other end of the lever 98 has a slot 105 having a pin 104 extending therethrough and through the armature 106 of a solenoid 108 to cause operating engagement between the solenoid 108 and the lever 98. The solenoid 108 is fixed at its base to a cross piece 110 rigidly held between the opposed brackets 102 as by screws 112. Also fixed to the cross piece 110 is an electromagnetic time delay device 114 having an adjustable time delay cycle controlled by the adjusting screw 116 as will be hereinafter more fully described.

The vertical support plate 16 is mounted to slide vertically in channels 118 at its opposed ends. Each of the channels 118 are formed by an upright bracket 120 rigidly fixed at its bottom end to a base 122 and a channel plate 124 fixed to the upright bracket 120 by screws 126. At their upper ends, the upright brackets 120 have attached thereto as by screws 128 a handle 130 for transporting the machine 10. At the lower portion of each of the upright brackets 120 there is a perpendicularly disposed web 132 for adding rigidity to the construction.

Rotatably mounted as in sleeve bearings 134 fixed through each of the web portions 132 of the upright brackets 120, is a horizontal shaft 136 substantially parallel to the vertical support plate 16. The shaft 136 has fixed thereto as by a set screw 138 a gear 140 in mesh with a vertically disposed rack 142 fixed to the vertical support plate 16 by screws 144. Another gear 146, also fixed to the shaft 136 as by a set screw 148, is in mesh with a worm gear 150 held in place by a bracket 152 fixed to the upright bracket 120. An adjusting handle 154 is fixed to the end of the worm 150 for the manual transmission of rotary motion to the gear arrangement. The gear arrangement cooperates with the rack 144 to provide vertical adjustment of the support plate 16 and the components mounted thereto. The support plate 16 may be locked in any suitable position of adjustment by a hand operable lock screw 155.

The base 122 is mounted at its corners preferably on resilient pads 156 of gripping material as a rubber composition.

Mounted on the base 122 is a slide 158 slidably holding a horizontally adjustable arm 160. To the end of the arm 160 is fixed a normally open switch 162 with a control button 164 for closing the switch directed toward the centerline 38. The arm 160 and thereby the switch 162 may be locked at any suitable position of adjustment by a hand operable lock screw 166. The slide 158 has also adjustably mounted thereto a gage 168 having gaging elements 170 attached thereto as by rivets 172. The gaging elements 170 are made preferably of a resilient gripping material such as a rubber composition. The gage 168 is made preferably of angular sections for rigidity and has a slot 174 (Fig. 5) extending horizontally thereof. Extending through and straddling the slot 174 is a hand operable lock screw 176 for clamping the gage 168 at any selected gaging position.

Referring to Fig. 7, the electrical connections entail essentially two electric circuits. One of the circuits is for the solenoid 108 and the other of the circuits is for the time delay mechanism 114. In the first circuit, a conductor or line 178 running from a suitable power source which may be a standard 110 volt alternating current power source is connected to a line 180 and then line 182 to one end 184 of an energizing coil 186 of the solenoid 108. The other end of the energizing coil 186 is connected through a line 188 to an electric terminal 190 which is suitably anchored in place by the element 192 from which it is insulated by the insulator 194. The terminal 190 is normally in electrical contact with the terminal 196 by means of the conducting element 198 which is suitably insulated from and connected to the lower end of an armature 200 of a solenoid 202 in the time delay relay 114. The terminal 196 is held in place by an anchor element 192 and an insulator 194 similarly to the terminal 190. The terminal 196 is connected through a line 204 to terminal 206 of the normally open switch 162. An arm 208, made of conducting material, is normally disengaged from the terminal 206 and a terminal 210 in the switch 162 because of a compression spring 212. The conducting arm 208 makes contact with the terminals 206 and 210 only when the control button 164 to which it is connected is pushed forward as by a container 214. The terminal 210 is connected through line 216 to line 218 which leads to the other terminal of the power source.

The other circuit leads from line 178 through 180 to one end of a coil 220 of the solenoid 212. The other end of the coil 220 is connected through a line 222 to line 204 and thereby through the normally open switch 162 and line 216 to line 218 leading to the other terminal of the power source. It will be noted that both of the above circuits are controlled by the normally open switch 162. Lines 178 and 218 are also connected to the motor 12 to supply power thereto.

In operation of the machine, the motor 12 being in contact with the power source through lines 178 and 218 is normally transmitting rotary motion through pulley 20 and V belt 24, idler spindle 26, shock absorber sleeve 56 and clutch 77 to the adapter 42 and chuck 78 which is fixed to the adapter. A container 214 with a cap 224 loosely seated on the container as shown in Fig. 3 is manually placed against the gripping elements 170 of the gage 168. Prior to this the gage 168 has been adjusted and clamped in place by the lockscrew 176 in such position that when the container 214 touches the gaging elements 170, the container 214 and cap 224 will be in alignment with the chuck 78. Also previous to this, the position of the switch 162 has been adjusted by means of the sliding arm 160 so that when the container 214 has reached the above described alignment position it will have forced the control button 164 and thereby the conducting arm 208 forward against the pressure of the compression spring 212 until electrical contact is made between terminals 206 and 210 in the normally open switch 162. Thereby, the normally open switch 162 is closed causing current to flow through lines 178, 180, 182, coil 186, line 188, terminal 190, arm 198, terminal 196, line 204, terminal 206, arm 208, terminal 210, line 216, line 218 back to the power source. Thus, the solenoid 108 is energized, pulling its armature 106 upward as shown in Fig. 7. This causes an upward movement at the armature end of the lever 98 and a downward movement at the other end of lever 98 because of the pivot 100. The rollers 96 in groove 94 of the adapter 42 thereby force the adapter 42 downward which in turn forces the chuck 78 downward upon the cap 224 and causes gripping engagement between the resilient gripping element 92 and the cap 224.

This downward movement also disengages the driven clutch element or flange 52 from the driver clutch element or disk 60 and places the adapter 42 and chuck 78 in free wheeling on the shaft 36 with the kinetic energy stored therein from the previous driving engagement of the clutch elements.

Upon the chuck 78 gripping the cap 224, this stored kinetic energy quickly rotates the cap 224 and seats it firmly into place on the container 214. The force with which the cap is seated on the container 214 is controlled by the amount of kinetic energy stored in the chuck 78 and adapter 42 and may be easily varied for a particular size of cap and container by changing the chuck 78 as explained above to a chuck having a suitable moment of inertia built therein. Or it may be changed by changing the speed of rotation of the chuck 78 by changing the ratio of the pulleys 20 and 22 or the speed of the motor 12 as by using a rheostat (not shown).

It will be noted that the closing of the switch 162 also energizes the coil 220 of the solenoid 202 causing an upward force on the armature 200. However, the movement of the armature 200 is delayed for a brief period due to the dashpot effect of a compression spring 226 and a piston 228 in a cylinder 230 or by a suitable bellows construction which has air trapped therein. A time delay relay known commercially as an Agastat has been found suitable for this purpose. Other types of delay relays, however, may also be used. The time of delay may be controlled by controlling the size of the air escapement orifice 232 as by the screw 116. Thus after a time delay period from the moment of the closing of the switch 162 the armature 200 will open the contact between terminals 190 and 196 thereby de-energizing the solenoid 108. The de-energizing of the solenoid 108 will cause the compression spring 70 to force the shaft 36 upwardly and thereby the adapter 42 and chuck 78 away from the container cap 224 to the position shown in Fig. 3. The container 214 with its cap 224 suitably seated thereon can then be removed from the machine. This upward movement of the adapter 42 and chuck 78 causes the flange 52 to again engage the driving elements of the clutch 77 at the end of the idler spindle so as to again build up the rotary kinetic energy in the adapter 42 and chuck 78 in preparation for another capping cycle similar to that just described.

The time delay of the relay 114 is preferably so set that the chuck 78 will come to a complete stop before the solenoid 108 is de-energized. By such a time cycle all of the kinetic is used and the degree of seating of the cap 224 on container 214 may be controlled within fine limits. In bringing the chuck back to its normal speed from a full stop by means of clutch 77 and idler spindle 26 the shock absorbing sleeve 56 with the shock absorbing springs 66 assures smooth operation even at high spindle speeds.

The gaging elements 170 being made of resilient gripping material assist materially in holding the container in place manually against the torque exerted by chuck 98 in seating the cap 224. Also, the pads 156 being of resilient gripping material provide frictional grip to absorb the above rotary torque and prevent the machine from slipping on the bench or other support on which it is resting.

The principle of operation of the machine permits use of aluminum alloy for most of the structural members as base 122, support plate 16, brackets 120 and 102 and spindle housing 32 without impairing needed strength and stability requirements. Use of aluminum for such structural elements reduces overall weight and further enhances the portability of the machine.

This invention is not limited to the particular details herein shown and described as equivalents will suggest themselves to those skilled in the art.

What I claim is:

1. In a machine for screwing and tightening caps on containers, the combination of a chuck for gripping the cap mounted to rotate about and move along a path in alignment with a cap loosely seated on a container, means yieldably holding said chuck in spaced relation to said cap, means for rotating said chuck in said spaced relation position, an electric circuit, electromagnetic means in said circuit connected to move said chuck along said path into gripping engagement with said cap, and switch means in said circuit for controlling the operation of said electromagnetic means.

2. The combination as in claim 1 wherein the switch means includes a normally open switch positioned to be closed by the container when in alignment with the chuck, and a time delay mechanism in operating engagement with the normally open switch for opening said circuit in a controlled period of time after the closing of said normally open switch.

3. In a machine for screwing and tightening caps on containers, the combination of means for locating a container with cap loosely seated thereon in a predetermined position, a chuck for gripping the cap mounted to rotate about and move along a path in alignment with said cap and container, means yieldably holding said chuck in said spaced relation to said cap, means for rotating said chuck in said spaced relation position, a first and a second electric circuits, a normally open switch in both electric circuits, a normally closed switch in said first electric circuit, electromagnetic means in said first electric circuit connected to move said chuck along said path into gripping engagement with said cap, and a time delay relay in said second circuit in control engagement with said normally closed switch, whereby to open said normally closed switch in a controlled period of time after the closing of said normally open switch.

4. The combinantion as in claim 3 wherein the normally open switch is positioned at the locating means to be closed by the container when in the predetermined position.

5. In a machine for screwing and tightening caps on containers, the combination of means for locating a container with a cap loosely seated thereon in a predetermined position, a chuck for gripping the cap mounted to rotate about and move along a path in alignment with said cap and container, means yieldably holding said chuck in spaced relation to said cap, means for rotating said chuck in said spaced relation position, a first and a second electric circuits, a normally open switch in both electric circuits, a normally closed switch in said first electric circuit, a first solenoid with armature in said first circuit, the armature of said solenoid being connected to move said chuck along said path into gripping engagement with said cap, a second solenoid with armature in said second circuit, the armature of said second solenoid connected to open said normally closed switch when said second solenoid is energized, and means for delaying said opening action for a controlled period of time after the energizing of said second solenoid, whereby to open said normally closed switch in a controlled period of time after the closing of said normally open switch.

6. In a machine for screwing and tightening caps on containers, the combination of a chuck for gripping the cap mounted to rotate about and move along an axis in alignment with the cap and container, means for rotating said chuck, a clutch between said chuck and rotating means for transmitting rotary motion therebetween, said clutch comprising a driver element fixed to said rotating means and a driven element fixed to said chuck, means for maintaining driving engagement between said clutch elements, and control means for disengaging said clutch elements and moving said chuck along said axis into gripping engagement with said cap, whereby to cause the screwing and tightening of the cap by kinetic energy.

7. In a machine for screwing and tightening caps on containers, the combination of means for locating a container with cap loosely seated thereon in a predetermined position, a spindle mounted to rotate in spaced relation to and about an axis in alignment with the cap and container, a shaft extending through said spindle and free to slide along said axis, a chuck for gripping the cap mounted to rotate on the end of said shaft between said spindle and cap, a clutch between said chuck and spindle for transmitting rotary motion therebetween, said clutch comprising a driver element fixed to said spindle and a driven element fixed to said chuck, spring means at the other end of said shaft yieldably holding the driven element in driving engagement with the driving element and thereby the chuck in spaced relation to the cap, and control means for moving said chuck and shaft along said axis into gripping engagement with the cap, whereby to disengage the clutch elements and cause the screwing and tightening of the cap by kinetic energy.

8. The combination as in claim 7 wherein the means for moving the chuck and shaft into gripping engagement with the cap is comprised of electromagnetic means connected to the chuck and switch means for controlling the operation of the electromagnetic means.

9. The combination as in claim 7 wherein the means for moving the chuck and shaft into gripping engagement with the cap is comprised of electromagnetic means connected to the chuck and switch means for controlling the operation of the electromagnetic means, the switch means including a normally open switch positioned at the container locating means to be closed by the container when in alignment with the chuck for energizing of said electromagnetic means, and a time delay mechanism in operative engagement with the normally open switch for de-energizing of said electromagnetic means in a controlled period of time after the closing of said normally open switch.

10. In a machine for screwing and tightening caps on containers, the combination of a base, a support member, mounting means fixed to said base for adjustably mounting said support member in substantially perpendicular relation to the base, means for making said adjustment, a spindle rotatably mounted to said support member with its axis substantially parallel to said direction of adjustment, a motor fixed to said support member and in driving engagement with said spindle, a shaft in said spindle mounted to slide along said axis, a chuck for gripping said cap mounted to rotate at the end of said shaft, a clutch between said chuck and spindle for transmitting rotary motion therebetween, said clutch comprising a driver element fixed to said spindle and a driven element fixed to said chuck, a spring at the other end of said shaft yieldably holding said driven element in driving engagement with said driver element and thereby said chuck in spaced relation to said cap and container, and control means for moving said chuck and shaft along said axis into gripping engagement with said cap, whereby to disengage the clutch elements and cause the screwing and tightening of the cap by kinetic energy.

11. In a machine for screwing and tightening caps on containers, the combination of a base, a vertically disposed spindle, means fixed to said base for mounting said spindle to rotate about a vertical axis aligned with said cap and container, a shaft through said spindle free to slide along said axis, an adapter for receiving a cap screwing chuck mounted to the lower end of said shaft to rotate about said axis, a friction clutch between said spindle and adapter, said clutch having a friction driving element fixed to the lower end of said spindle and a friction driven element fixed to the upper end of said adapter, a stop member fixed to the other end of said shaft, and a spring compressed between said stop member and spindle to force said shaft upwardly with respect to said spindle and thereby causing yieldable engagement between said clutch elements.

References Cited in the file of this patent

UNITED STATES PATENTS

| | | |
|---|---|---|
| 2,061,241 | Lindholm et al. | Nov. 17, 1936 |
| 2,106,365 | Tiano | Jan. 25, 1938 |